US012645440B2

(12) United States Patent
Jo et al.

(10) Patent No.: US 12,645,440 B2
(45) Date of Patent: Jun. 2, 2026

(54) METHOD AND APPARATUS FOR COMPILING OPTIMIZATION USING ACTIVATION RECALCULATION

(71) Applicant: MOREH CORP., Seoul (KR)

(72) Inventors: Gangwon Jo, Seoul (KR); Jungho Park, Seoul (KR)

(73) Assignee: MOREH CORP., Seoul (KR)

( * ) Notice: Subject to any disclaimer, the term of this patent is extended or adjusted under 35 U.S.C. 154(b) by 317 days.

(21) Appl. No.: 18/426,983

(22) Filed: Jan. 30, 2024

(65) Prior Publication Data

US 2024/0303054 A1    Sep. 12, 2024

(30) Foreign Application Priority Data

Mar. 6, 2023    (KR) ........................ 10-2023-0029483
Aug. 8, 2023    (KR) ........................ 10-2023-0103482

(51) Int. Cl.
| | |
|---|---|
| *G06F 8/41* | (2018.01) |
| *G06F 11/14* | (2026.01) |
| *G06F 11/20* | (2006.01) |
| *G06F 11/30* | (2006.01) |

(52) U.S. Cl.
CPC ............... *G06F 8/45* (2013.01); *G06F 8/443* (2013.01); *G06F 11/1407* (2013.01); *G06F 11/143* (2013.01); *G06F 11/1438* (2013.01); *G06F 11/2025* (2013.01); *G06F 11/2028* (2013.01); *G06F 11/203* (2013.01); *G06F 11/302* (2013.01)

(58) Field of Classification Search
None
See application file for complete search history.

(56) References Cited

U.S. PATENT DOCUMENTS

| | | | | |
|---|---|---|---|---|
| 8,972,960 B2 * | 3/2015 | Brauneis | ............. | G06F 11/3409 |
| | | | | 717/158 |
| 2019/0324856 A1 * | 10/2019 | Zhao | ...................... | G06N 3/098 |
| 2024/0303054 A1 * | 9/2024 | Jo | ........................ | G06F 11/3466 |
| 2024/0303138 A1 * | 9/2024 | Jo | ........................... | G06F 8/451 |

FOREIGN PATENT DOCUMENTS

| | | | | |
|---|---|---|---|---|
| JP | 2020-508532 A | 3/2020 | | |
| WO | WO-2018154494 A1 * | 8/2018 | ............. | G06N 3/045 |

OTHER PUBLICATIONS

Li, "The Deep Learning Compiler: A Comprehensive Survey", 2020, IEEE (Year: 2020).*
Meng, "Training Deeper Models by GPU Memory Optimization on TensorFlow", 2017, NIPS 2017 (Year: 2017).*

* cited by examiner

*Primary Examiner* — Hossain M Morshed
(74) *Attorney, Agent, or Firm* — Banner & Witcoff, Ltd.

(57) ABSTRACT

A method for compilation optimization using activation recalculation is provided, which is performed by one or more processors, and includes receiving a source program, determining an operation to be executed in a processor based on the source program, and determining whether or not the operation to be executed corresponds to the operation for activation recalculation, thereby automatically classifying the operation to be executed into a first operation type corresponding to the operation for activation recalculation or a second operation type not corresponding to the operation for activation recalculation.

20 Claims, 9 Drawing Sheets

METHOD AND APPARATUS FOR COMPILING OPTIMIZATION USING ACTIVATION RECALCULATION

CROSS-REFERENCE TO RELATED APPLICATIONS

This application claims priority under 35 U.S.C § 119 to Korean Patent Application No. 10-2023-0029483 and No. 10-2023-0103482, filed in the Korean Intellectual Property Office on Mar. 6, 2023 and Aug. 8, 2023, respectively, the entire contents of which are hereby incorporated by reference.

TECHNICAL FIELD

The present disclosure relates to a method and apparatus for a compilation optimization using activation recalculation, and specifically, to a method and apparatus for classifying an operation to be executed in a processor determined based on a source program according to whether or not the operation corresponds to an operation for activation recalculation, and recalculating activation of certain operations.

BACKGROUND

A compiler is a language translation program that converts codes written in a specific programming language into another language (e.g., machine language) that can be read by a computer processor. A general compiler performs the process of converting a specific programming language into another language by sequentially analyzing the vocabulary, syntax, and semantics of a source program, generating an intermediate representation such as intermediate code, optimizing the code, and generating an object code. In the field of compiler technology, technological advances have been made to improve the speed and efficiency of target programs by optimizing this conversion process.

Meanwhile, training deep learning models requires considerable computing resources such as memory. In particular, "activation" is used for storing the intermediate values of the neural network during the forward propagation and back propagation processes in the neural network, often causing considerable memory waste by occupying the memory for a certain period of time even when the corresponding data is not actually used after being stored in memory.

As described above, when the limited memory resources are wasted and free memory space is insufficient, there is a problem that it is difficult to process a large amount of data within the same time period and the performance of model learning may deteriorate.

SUMMARY

In order to solve one or more problems (e.g., the problems described above and/or other problems not explicitly described herein), the present disclosure provides a method, a recording medium and a system (apparatus) for compiling optimization using activation recalculation.

The present disclosure may be implemented in a variety of ways, including a method, a system (device), or a computer program stored in a readable storage medium.

A method for compilation optimization using activation recalculation is provided, which may be performed by one or more computing devices and include receiving a source program, determining an operation to be executed in a processor based on the source program, and determining whether or not the operation to be executed corresponds to the operation for activation recalculation, thereby automatically classifying the operation to be executed into a first operation type corresponding to the operation for activation recalculation or a second operation type not corresponding to the operation for activation recalculation.

The automatically classifying may include determining whether the operation to be executed corresponds to the operation for activation recalculation based on a memory usage of an activation associated with the operation to be executed and a processing time of the operation to be executed, thereby automatically classifying the operation to be executed into the first operation type or second operation type.

The automatically classifying the operation to be executed into the first operation type or the second operation type may include classifying the operation to be executed into the first operation type, in response to determining that the memory usage of the activation associated with the operation to be executed against the processing time of the operation to be executed is equal to or greater than a first threshold, and classifying the operation to be executed as a second operation type, in response to determining that the memory usage of the activation associated with the operation to be executed against the processing time of the operation to be executed is less than the first threshold.

The first threshold may be updated based on a throughput of one or more iterations of an executable program based on the source program.

The operation to be executed may include a plurality of operations, and the automatically classifying the operation to be executed into the first operation type or the second operation type may include arranging the plurality of operations in descending order of memory usage of activation associated with each of the plurality of operations against processing time of each of the plurality of operations, calculating, with respect to the arranged plurality of operations, a cumulative usage of activation memory, starting from an operation having a highest memory usage of activation associated with each of the plurality of operations against the processing time of each of the plurality of operations, to a target operation, and classifying the target operation into the first operation type, if the cumulative usage of activation memory is less than a second threshold.

The automatically classifying the operation to be executed into the first operation type or the second operation type may include classifying the target operation into the second operation type, if the cumulative usage of activation memory is greater than the second threshold.

The operation to be executed may include a plurality of operations, and the automatically classifying the operation to be executed into the first operation type or the second operation type may include arranging the plurality of operations in descending order of memory usage of activation associated with each of the plurality of operations against processing time of each of the plurality of operations, calculating, with respect to the arranged plurality of operations, a cumulative processing time, starting from an operation having a highest memory usage of activation associated with each of the plurality of operations against processing time of each of the plurality of operations, to a target operation, and classifying the target operation into the first operation type, if the cumulative processing time is less than a third threshold.

The classifying the operation to be executed may further include classifying the target operation into the second operation type, if the cumulative processing time is greater than the third threshold.

A computer-readable non-transitory recording medium storing instructions for executing the method described above on a computer is provided.

An information processing system may be provided, which may include a communication module, a memory, and one or more processors connected to the memory and configured to execute one or more computer-readable programs included in the memory, and the one or more programs may further include instructions for receiving a source program, determining an operation to be executed in a processor based on the source program, and determining whether or not the operation to be executed corresponds to the operation for activation recalculation, thereby automatically classifying the operation to be executed into a first operation type corresponding to the operation for activation recalculation or a second operation type not corresponding to the operation for activation recalculation.

According to various examples of the present disclosure, activation recalculation can be performed only for operations having a high efficiency of activation recalculation.

According to various examples of the present disclosure, a free memory space according to activation recalculation can be ensured to the maximum based on the upper limit of performance degradation.

According to various examples of the present disclosure, the memory usage by the activation can be reduced, thereby ensuring a free memory space, and a model of a larger size can be processed in the processor, or training of different models can be performed simultaneously, or batches or sets of operations of a larger size can be processed in parallel.

The effects of the present disclosure are not limited to the effects described above, and other effects not described herein can be clearly understood by those of ordinary skill in the art (hereinafter referred to as "ordinary technician") from the description of the claims.

BRIEF DESCRIPTION OF THE DRAWINGS

The above and other objects, features and advantages of the present disclosure will be described with reference to the accompanying drawings described below, where similar reference numerals indicate similar elements, but not limited thereto, in which.

DETAILED DESCRIPTION

Figure 1:
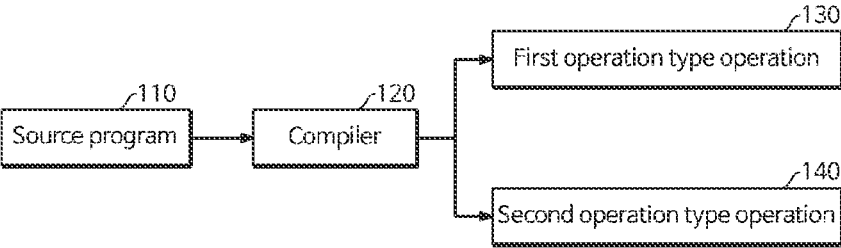
FIG. 1 illustrates a process in which an operation determined by a compiler based on a source program is classified into either a first operation type operation or a second operation type operation.

Hereinafter, example details for the practice of the present disclosure will be described in detail with reference to the accompanying drawings. However, in the following description, detailed descriptions of well-known functions or configurations will be omitted if it may make the subject matter of the present disclosure rather unclear.

In the accompanying drawings, the same or corresponding components are assigned the same reference numerals. In addition, in the following description of various examples, duplicate descriptions of the same or corresponding components may be omitted. However, even if descriptions of components are omitted, it is not intended that such components are not included in any example.

Advantages and features of the disclosed examples and methods of accomplishing the same will be apparent by referring to examples described below in connection with the accompanying drawings. However, the disclosure is not limited to the examples disclosed below, and may be implemented in various forms different from each other, and the examples are merely provided to make the disclosure complete, and to fully disclose the scope of the disclosure to those skilled in the art to which the disclosure pertains.

The terms used herein will be briefly described prior to describing the disclosed example(s) in detail. The terms used herein have been selected as general terms which are widely used at present in consideration of the functions of the disclosure, and this may be altered according to the intent of an operator skilled in the art, related practice, or introduction of new technology. In addition, in specific cases, certain terms may be arbitrarily selected by the applicant, and the meaning of the terms will be described in detail in a corresponding description of the example(s). Therefore, the terms used in the disclosure should be defined based on the meaning of the terms and the overall content of the disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it is intended as meaning that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to play one or more processors. Accordingly, as an example, the "module" or "unit" may include components such as software components, object-oriented software components, class components, and task components, and at least one of processes, functions, attributes, procedures, subroutines, program code segments, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

The "module" or "unit" may be implemented as a processor and a memory. The "processor" should be interpreted broadly to encompass a general-purpose processor, a central processing unit (CPU), a microprocessor, a digital signal processor (DSP), a controller, a microcontroller, a state machine, and so forth. Under some circumstances, the "processor" may refer to an application-specific integrated circuit (ASIC), a programmable logic device (PLD), a field-programmable gate array (FPGA), and so on. The "processor" may refer to a combination for processing devices, e.g., a combination of a DSP and a microprocessor, a combination of a plurality of microprocessors, a combination of one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EE-PROM), flash memory, magnetic or optical data storage, registers, and so on. The memory is said to be in electronic communication with a processor if the processor can read information from and/or write information to the memory. The memory integrated with the processor is in electronic communication with the processor.

In the present disclosure, a "node" may refer to a device or component that participates in operation, communication or resource management, etc. of a system within a network or system that performs a specific task or function. For example, the node may include physical servers, virtual machines, storage devices, network switches, routers, or other computing elements which are interconnected to each other and work together to provide services, to share resources, to process data, etc.

In this disclosure, the "accelerator" may refer to any processor or circuitry that performs calculations. For example, the accelerator may refer to a processor or circuitry capable of performing calculations quickly, and may include a graphics processing unit (GPU), a neural processing unit (NPU), a tensor processing unit (TPU), etc., for example, but not limited thereto.

In the present disclosure, a "source program" may refer to a collection of instructions written in a programming language designed to perform a specific task. For example, the source program may be written to perform a deep learning task, and the referenced data may be implemented with any data type (e.g., tensor type data) that may form a deep learning program. The source program may form the original and primary output of the programming process and may be converted into machine code through a compilation process or interpreted directly at run time. The source program may be written across multiple files and may include code libraries and dependencies.

In the present disclosure, an "activation" may refer to data used for storing an intermediate value of a neural network during forward propagation and backward propagation processes in the neural network. For example, the activation tensor may store activations which are outputs of nonlinear activation functions applied to inputs or outputs of various layers of the network. For example, activation may refer to input activation, intermediate activation, and/or output activation. Additionally, "activation recalculation" may refer to the process of recomputing an activation. For example, "operation for activation recalculation" may refer to an operation that an activation related to the operation is recomputed in response to an occasion in which the intermediated value is necessary for the subsequent process.

FIG. 1 illustrates a process in which an operation determined by a compiler 120 based on a source program 110 is classified into either a first operation type operation 130 or a second operation type operation 140. The source program 110 may be a collection of instructions written in a programming language designed to perform deep learning tasks.

The compiler 120 may determine an operation to be executed in the processor based on the source program 110. For example, an intermediate expression may be first determined in the compiler 120, and the determined intermediate expression may be translated into an object code for a specific machine, thereby determining a plurality of operations including operations performed on training data of a machine learning model to be executed in the processor (or accelerator, etc.)

The processor in which the operation determined by the compiler 120 is executed may correspond to an accelerator such as a central processing unit (CPU), a graphics processing unit (GPU), a neural processing unit (NPU), a tensor processing unit (TPU), a core included in a processing unit, a group or node including a plurality of processing units, etc., but is not limited thereto.

It may be determined whether the operation to be executed in the processor corresponds to an operation for activation recalculation, and may be classified into a specific operation type. For example, the operation to be executed in the processor may be automatically classified into the first operation type operation 130 corresponding to an operation for activation recalculation or the second operation type operation 140 not corresponding to the operation for activation recalculation.

In the case of the first operation type operation 130 for activation recalculation, an activation associated with the first operation type operation 130 may not be stored in the memory during a process in which the first operation type operation 130 is processed.

That is, if the activation associated with the first operation type operation 130 is not stored in the memory and data associated therewith is needed, recalculation may be performed. For example, if a reverse process for specific training data is performed during calculation of a gradient of an artificial neural network, at least a part of already processed forward process is recalculated, thereby reducing memory costs required to store activations.

On the other hand, in the case of the second operation type operation 140 for activation recalculation, an activation associated with the second operation type operation 140 may be stored in the memory during a process in which the second operation type operation 140 is processed.

That is, in the case of the second operation type operation 140, although it is difficult to expect the effect of memory cost reduction that is provided by the first operation type operation 130, because the recalculation process is not performed, it is possible to reduce the computation cost compared to the first operation type operation 130.

Whether a specific operation corresponds to an operation for activation recalculation or not may be determined based on a memory usage of an activation associated with the specific operation and/or processing time of the specific operation. Based on the determination result, the specific operation may be automatically classified into the first operation type operation 130 or the second operation type operation 140.

For example, in response to determining that the memory usage of the activation associated with the operation to be executed against the processing time of the operation to be executed is equal to or greater than a predetermined threshold, the operation to be executed may be classified into the first operation type operation 130 that is an operation for activation recalculation.

On the other hand, in response to determining that the memory usage of the activation associated with the operation to be executed against the processing time of the operation to be executed is less than the predetermined threshold, the operation to be executed may be classified into the second operation type operation 140 that is an operation not for activation recalculation.

For example, if a threshold is previously set to 100 MB/ms, for an operation that takes 1 ms or less to generate an activation tensor of 100 MB, the memory usage of the activation associated with the operation to be executed against the processing time of the operation is equal to or greater than the threshold, in which case the operation may be classified into the first operation type operation 130.

With this configuration, the memory usage by the activation can be reduced, thereby ensuring a free memory space, and a model of a larger size can be processed in the processor, or training of different models can be performed simultaneously, or batches or sets of operations of a larger size can be processed in parallel.

The threshold for comparison with the memory usage of the activation associated with the operation to be executed against the processing time of the operation to be executed may be updated based on throughput of one or more iterations of an executable program based on a source program.

For example, in the first iteration, all operations to be executed are classified into the operations for activation recalculation, and the size of memory saved for each activation, the processing time according to recalculation, etc. may be calculated. In this case, the amount of data processed based on the time excluding the recalculation processing time from the processing time in the first iteration may correspond to the maximum value of the throughput. If the maximum value of throughput is calculated and the throughput reduction amount in the next iteration is less than a predetermined percentage (e.g., 20%) of the maximum value of throughput, the threshold may be set to decrease so as to increase the number of activations for recalculation. On the other hand, if the throughput reduction amount of the next iteration is greater than the predetermined percentage of the maximum value of the throughput, the threshold may be set to increase so as to decrease the number of activations for recalculation. That is, the throughput in the current iteration can be reduced compared to the throughput in the previous iteration, but if the throughput reduction amount is not large, further reduction of performance may be acceptable, and accordingly, the threshold may be determined so as to increase the recalculation amount of activation.

Alternatively, the threshold may be initially set as an allowable maximum threshold and determined so as to converge to a specific value while decreasing or increasing from the maximum threshold based on a comparison result between the throughput of the current iteration and a reference throughput. For example, a throughput corresponding to a predetermined percentage (e.g., 50%) of the maximum value of the throughput may be set to be the reference throughput. If the throughput at the threshold of 50% of the maximum threshold is less than the reference throughput, the threshold may be set to 75% of the maximum threshold, and if the throughput is equal to or greater than the reference throughput, the threshold may be set to 25%. If the threshold is set to 75% of the maximum threshold, the threshold may be set to 62.5% of the maximum threshold if the throughput at the threshold of 75% of the maximum threshold is equal to or greater than the reference throughput, and may be set to 87.5% of the threshold if the throughput is less than the reference throughput. That is, the increase and decrease range of the threshold may be reduced at a constant rate for each iteration, the throughput in the current iteration may be compared with the reference throughput, and the threshold may be increased or decreased by a set increase and decrease range based on the comparison result, such that the threshold may be set so as to converge to a specific value.

In another example, if the throughput of the current iteration of the executable program is equal to or greater than the reference throughput, the threshold may be reduced by a predetermined percentage (e.g., 150%). Alternatively, if the throughput of the current iteration is less than the reference throughput, the threshold may be increased by a predetermined percentage. If the threshold oscillates between two values as the iteration repeats, the average of the two values may be set as the threshold.

In another example, the threshold may be determined based on a cost model. For example, the cost model may calculate, for various thresholds, an expected execution time for each iteration of the executable program, a size of memory saved according to activation recalculation, an increasing operation processing time, etc. by utilizing a database in which the processing time of each operation is stored, and based on the same, the threshold may be determined. For example, by using a cost model instead of the process of increasing or decreasing the threshold as described above, it is possible to determine the performance degradation and the size of memory saving against the maximum value of the throughput according to each recalculation of each activation, and accordingly specify the activations for recalculation.

For example, the cost model may set a value within a specific range (e.g., 1 MB/ms to 10,000 MB/ms) as a candidate value of the threshold, and calculate the expected execution time for each iteration of the executable program. The cost model may set, as a threshold, a threshold candidate value that maximizes memory savings within a percentage of the execution time increased from the expected execution time against a predetermined minimum execution time (that is, a percentage of throughput reduction against maximum throughput). On the other hand, an activation for recalculation may be selected so as to maximize the memory savings within a percentage of the increasing the execution time against the minimum execution time (that is, a percentage of the throughput reduction against the maximum throughput) by directly using a cost model without previously determining the threshold candidate value.

Figure 2:
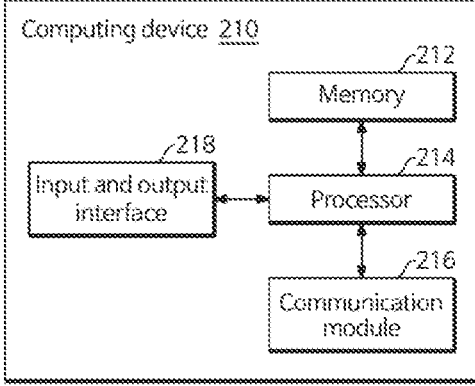
FIG. 2 is a block diagram of an internal configuration of a computing device.

FIG. 2 is a block diagram of an internal configuration of a computing device 210. The computing device 210 may include a memory 212, a processor 214, a communication module 216, and an input and output interface 218. As illustrated in FIG. 2, the computing device 210 may be configured to communicate information, data, etc. through a network by using the communication module 216. The computing device 210 may correspond to a user terminal or an information processing system, and it may be configured such that one of the user terminal or the information processing system is able to communicate information, data, etc. with the other via a network using the communication module 216.

The memory 212 may include any non-transitory computer-readable recording medium. The memory 212 may include a permanent mass storage device such as random access memory (RAM), read only memory (ROM), disk drive, solid state drive (SSD), flash memory, and so on. As another example, a non-destructive mass storage device such as ROM, SSD, flash memory, disk drive, and the like may be included in the computing device 210 as a separate permanent storage device that is separate from the memory. In addition, an operating system and at least one program code may be stored in the memory 212.

These software components may be loaded from a computer-readable recording medium separate from the memory 212. Such a separate computer-readable recording medium may include a recording medium directly connectable to the computing device 210, and may include a computer-readable recording medium such as a floppy drive, a disk, a tape, a DVD/CD-ROM drive, a memory card, and the like, for example. In another example, the software components may be loaded into the memory 212 through the communication module 216 rather than the computer-readable recording medium. For example, at least one program may be loaded into the memories 212 based on a computer program installed by files provided by developers or a file distribution system that distributes an installation file of an application through the communication module 216.

The processor 214 may be configured to process the commands of the computer program by performing basic arithmetic, logic, and input and output calculations. The commands may be provided to a user terminal (not illustrated) or another external system by the memory 212 or the communication module 216. In addition, the processor 214 may be configured to manage, process, and/or store the information and/or data received from a plurality of user terminals and/or a plurality of external systems.

The processor 214 may determine an operation to be executed in another processor based on the source program, and determine whether or not the operation to be executed corresponds to an operation for activation recalculation, thereby automatically classifying the operation to be executed into the first operation type corresponding to an operation for activation recalculation or the second operation type not corresponding to the operation for activation recalculation. The processor may classify the operation based on the memory usage of the activation associated with the operation to be executed and the processing time of the operation to be executed.

The communication module 216 may provide a configuration or function for the user terminal (not illustrated) and the computing device 210 to communicate with each other through a network, and may provide a configuration or function for the computing device 210 to communicate with an external system (e.g., a separate cloud system). For example, control signals, commands, data, etc. provided under the control of the processor 214 of the computing device 210 may be transmitted to the user terminal, the external system (e.g., a parallel computing system), etc. through the communication module 216 and the network through the communication module of the user terminal, external system, etc.

In addition, the input and output interface 218 of the computing device 210 may serve as a means for interfacing with a device (not illustrated) for input or output which may be connected to or included in the computing device 210. In FIG. 2, the input and output interface 218 is illustrated as a component configured separately from the processor 214, but aspects are not limited thereto, and the input and output interface 218 may be configured to be included in the processor 214.

The computing device 210 may receive a source program from a user, etc. through the input and output interface 218. Alternatively, the computing device 210 may also receive the source program through the communication module 216.

The computing device 210 may include more components than those illustrated in FIG. 2. Meanwhile, most of the related components may not necessarily require exact illustration.

Figure 3:
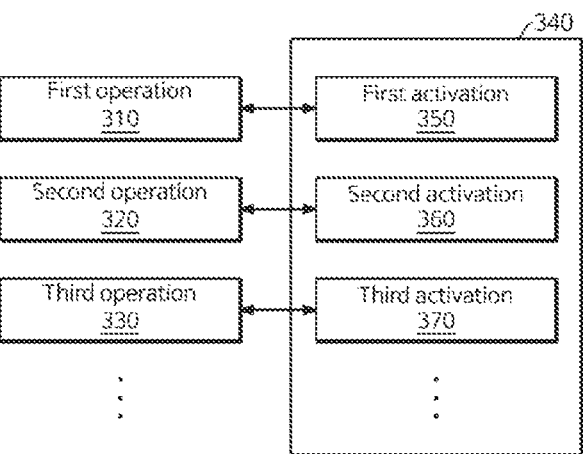
FIG. 3 illustrates an example in which an operation to be executed in a processor and an activation associated with the operation are allocated to a memory.

FIG. 3 illustrates an example in which operations 310, 320, and 330 to be executed in a processor and activations 350, 360, and 370 associated with the operations 310, 320, and 330 are allocated to a memory 340.

The operations 310, 320, and 330 may correspond to operations to be executed in a processor determined by a compiler based on a source program. For example, each of the operations 310, 320, and 330 may correspond to an operation associated with a forward propagation process or an operation associated with a backward propagation process of an artificial neural network, but is not limited thereto.

The activations 350, 360, and 370 may refer to data (e.g., tensors) used for storing an intermediate value of the operation in the artificial neural network. For example, the first activation 350, the second activation 360, and the third activation 370 may be activations associated with the processing of the first operation 310, the second operation 320, or the third operation 330, and may include input activation, intermediate activation, and/or output activation.

The activations 350, 360, and 370 are stored and allocated in the memory 340 shown in FIG. 3, and may represent the memory 340 if the compilation optimization using activation recalculation according to the present disclosure is not applied. That is, if the compilation optimization using activation recalculation according to the present disclosure is applied, at least some of the activations 350, 360, and 370 may not be stored and allocated in the memory 340.

Figure 4:
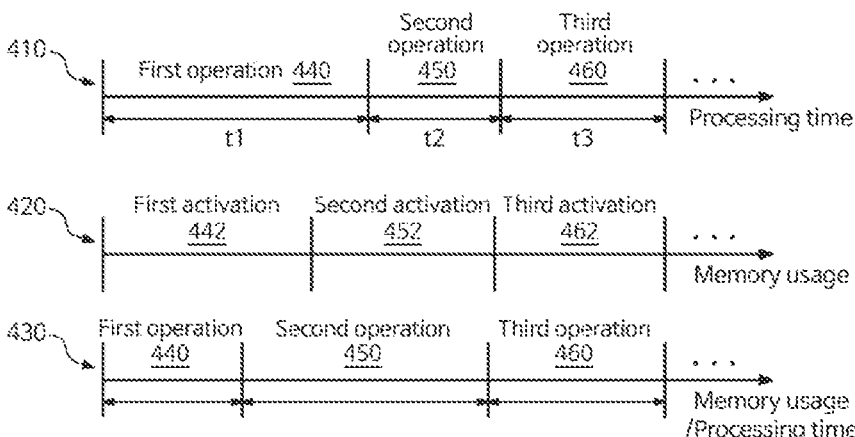
FIG. 4 illustrates a graph associated with processing time of an operation and memory usage of an activation.

FIG. 4 illustrates graphs 410, 420, and 430 associated with the processing times of operations 440, 450, and 460 and the memory usages of activations 442, 452, and 462.

The first graph 410 shows an example of the processing time of each of the operations 440, 450, and 460 to be executed in the processor. The processing times of the first operation 440, the second operation 450, and the third operation 460 are t1, t2, and t3, and may correspond to a magnitude relationship of t1>t3>t2. In addition, the first graph 410 does not necessarily mean that the first operation 440, the second operation 450, and the third operation 460 are executed in this order in the processor, but are shown sequentially for convenience of understanding.

The second graph 420 shows an example of memory usage for each of the first activation 442 associated with the first operation 440, the second activation 452 associated with the second operation 450, and the third activation 462 associated with the third operation 460 of the first graph 410.

The third graph 430 shows an example of the memory usages of the activations 442, 452, and 462 associated with the operations 440, 450, and 460 to be executed against the processing time of each of the operations 440, 450, and 460. The memory usage of the activation against the processing time of the operation may be calculated based on the processing times shown in the first graph 410 and the activation memory usages shown in the second graph 420, and it can be seen that the first operation 440, the third operation 460, and the second operation 450 increase in the order.

That is, as the memory usage of activation against the processing time of the operation increases, more free memory space can be ensured with less processing time during activation recalculation, and accordingly, it can be seen that the efficiency of reducing memory usage for activation recalculation increases in the order of the first operation 440, the third operation 460, and the second operation 450.

Figure 5:
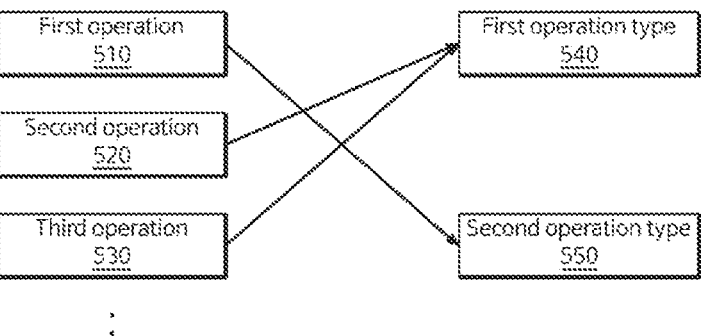
FIG. 5 illustrates an example in which an operation is classified into a first operation type corresponding to an operation for activation recalculation or a second operation type not corresponding to the operation for activation recalculation.

FIG. 5 illustrates an example in which operations 510, 520, and 530 are classified into a first operation type 540 corresponding to an operation for activation recalculation or a second operation type 550 not corresponding to the operation for activation recalculation.

The first operation 510, the second operation 520, and the third operation 530 of FIG. 5 correspond to the first operation 440, the second operation 450, and the third operation 460 of FIG. 4, respectively, and in this regard, details already described in FIG. 4 will be omitted.

The first operation type 540 may correspond to an operation type for activation recalculation, and the second operation type 550 may not correspond to an operation type for activation recalculation. That is, for the operation classified into the first operation type 540, instead of storing the activation associated with the operation in the memory, recalculation may be performed if necessary, and for the operation classified into the second operation type 550, the activation associated with the operation may be stored in the memory.

In response to determining that the memory usage of the activation associated with the operations 510, 520, and 530 against the processing time of the operations 510, 520, and 530 is equal to or greater than a predetermined threshold, the corresponding operation may be classified into the first operation type 540. On the other hand, in response to determining that the memory usage of the activation associated with the operations 510, 520, and 530 against the processing time of the operations 510, 520, and 530 is less than the predetermined threshold, the corresponding operation may be classified into the second operation type 550.

For example, the predetermined threshold may be greater than the memory usage of the activation associated with the first operation 510 against the processing time of the first operation 510 and may be smaller than the memory usage of the activation associated with the third operation 530 against the processing time of the third operation 530. Accordingly, the first operation 510 may be classified into the second operation type 550, and the second operation 520 and the third operation 530 may be classified into the first operation type 540.

With this configuration, activation recalculation may be performed only for operations having a high efficiency of activation recalculation.

Figure 6:
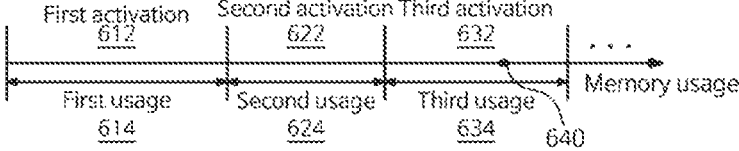
FIG. 6 illustrates an example of comparing a cumulative memory usage of activation with a threshold.

FIG. 6 illustrates an example of comparing a cumulative memory usage of activations 612, 622, and 632 with a threshold 640.

The first activation 612, the second activation 622, and the third activation 632 of FIG. 6 may correspond to activations of the first operation, the second operation, and the third operation, respectively, and a first usage 614, a second usage 624, and a third usage 634 may correspond to the memory usages of the first activation 612, the second activation 622, and the third activation 632, respectively.

The threshold 640 may be a memory saving target value (or upper limit) intended to be saved through the activation recalculation. The threshold 640 may be set in various ways, such as being directly set at the time of designing a source program or automatically readjusted based on remaining memory etc. during execution of an executable program.

The activations 612, 622, and 632 of FIG. 6 may be arranged in descending order of memory usages of the activations associated with each of the plurality of operations against processing time of each of the plurality of operations associated with each of the activations 612, 622, and 632. That is, the memory usage of the first activation 612 against the processing time of the first operation may be greater than the memory usage of the activation against the processing time of any other operation.

With respect to a plurality of arranged operations, a cumulative activation memory usage may be calculated, starting from an operation having the highest memory usage of activation associated with each of the plurality of operations against the processing time of each of the plurality of operations, to the target operation. For example, if it is assumed that the third operation is the target operation, the cumulative usage of activation memory may be calculated as the sum of the first usage 614, the second usage 624, and the third usage 634.

The type of the target operation may be classified by comparing the calculated cumulative usage of activation memory with the threshold 640. For example, if the calculated cumulative usage of activation memory is less than the threshold 640, the target operation may be classified into the first operation type corresponding to an operation for activation recalculation.

On the other hand, if the calculated cumulative usage of activation memory is greater than the threshold 640, the target operation may be classified into the second operation type not corresponding to the operation for activation recalculation. That is, the arranged operations may be sequentially added to the operation for activation recalculation until a memory saving target value of the memory can be ensured through the activation recalculation.

For example, if the second operation is the target operation, since the cumulative usage of activation memory is the sum of the first usage 614 and the second usage 624 and is less than the threshold 640, the second operation, which is the target operation, may be included in the first operation type.

On the other hand, if the third operation is the target operation, since the cumulative usage of activation memory is the sum of the first usage 614, the second usage 624, and the third usage 634 and this exceeds the threshold 640, the third operation, which is the target operation, may be included in the second operation type.

Meanwhile, if the calculated cumulative usage of activation memory is greater than the threshold 640, the operation (s) including the target operation may be classified into the first operation type, and the operation(s) after the target operation in the arranged operations may be classified into the second operation type.

Figure 7:
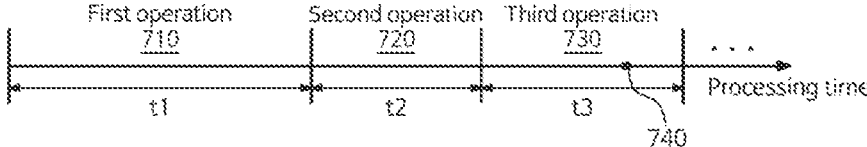
FIG. 7 illustrates an example of comparing cumulative processing time of an operation with a threshold.

FIG. 7 illustrates an example of comparing the cumulative processing time of operations 710, 720, and 730 with a threshold 740.

The first operation 710, the second operation 720, and the third operation 730 of FIG. 7 are associated with the first activation, the second activation, and the third activation, respectively, and may be completed during the first processing time t1, the second processing time t2, and the third processing time t3, respectively.

The threshold 740 may correspond to an upper limit of performance degradation through activation recalculation.

That is, the threshold 740 may be an upper limit of an additional time required for the activation recalculation of the operation. The threshold 740 may be set in various ways, such as being directly set at the time of designing a source program or automatically readjusted based on remaining memory during execution of an executable program.

The operations 710, 720, and 730 of FIG. 7 may be arranged in descending order of memory usage of activations associated with the operations 710, 720, and 730 against the processing time of each of the operations 710, 720, and 730, respectively. That is, the memory usage of the first activation against the processing time of the first operation 710 may be greater than the memory usage of the activation against the processing time of any other operation.

With respect to the plurality of arranged operations, a cumulative processing time may be calculated, starting from an operation having the highest memory usage of activation associated with each of the plurality of operations against the processing time of each of the plurality of operations, to the target operation. For example, if the third operation is the target operation, the cumulative processing time may be the sum of the first time t1, the second time t2, and the third time t3.

The type of the target operation may be classified by comparing the calculated cumulative processing time with the threshold 740. For example, if the calculated cumulative processing time is less than the threshold 740, the target operation may be classified into the first operation type corresponding to an operation for activation recalculation. On the other hand, if the calculated cumulative processing time is greater than the threshold 740, the target operation may be classified into the second operation type not corresponding to the operation for activation recalculation. That is, until the performance degradation upper limit is reached, the arranged operations may be sequentially included in the operation for activation recalculation.

For example, if the second operation is the target operation, since the cumulative processing time is the sum of the first time t1 and the second time t2 and is less than the threshold 740, the second operation, which is the target operation, may be included in the first operation type.

On the other hand, if the third operation is the target operation, since the cumulative processing time is the sum of the first time t1, the second time t2, and the third time t3, and greater than the threshold 740, the third operation, which is the target operation, may be included in the second operation type.

With this configuration, a free memory space according to activation recalculation can be ensured to the maximum based on the upper limit of performance degradation.

Meanwhile, if the cumulative processing time is greater than the threshold 740, the operation(s) including the target operation may be classified into the first operation type, and operation(s) after the target operation in the arranged operation may be classified into the second operation type.

Figure 8:
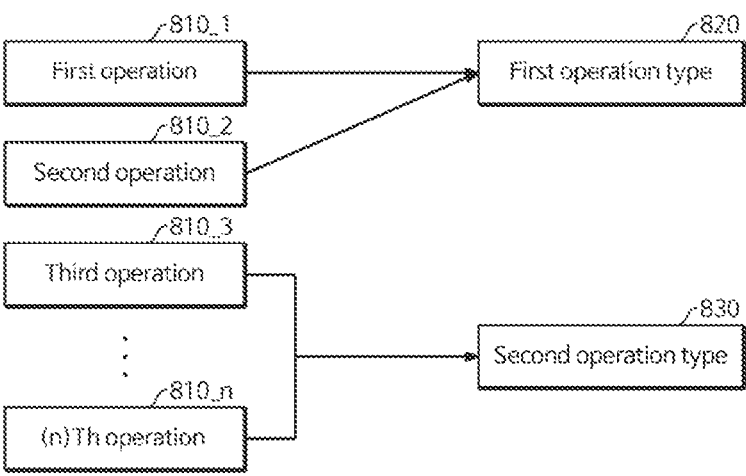
FIG. 8 illustrates an example in which operations are classified into a first operation type or a second operation type.

FIG. 8 illustrates an example in which operations 810_1 to 810_n are classified into a first operation type 820 or a second operation type 830. The operations 810_1 to 810_n may be arranged from top to bottom in an descending order of memory usage of activations associated with each of the operations 810_1 to 810_n against the processing time of each of the operations 810_1 to 810_n.

The operations 810_1 to 810_n may correspond to operations shown and described in FIGS. 6 and 7. That is, the cumulative usage of activation memory of the first operation 810_1, the second operation 810_2, and the third operation

810_3 may exceed the threshold or the cumulative processing time of the operations may exceed the threshold. Accordingly, the first operation 810_1 and the second operation 810_2 may be classified into the first operation type 820, and the third operation 810_3 to n-th operation 810_n may be classified into the second operation type 830.

Figure 9:
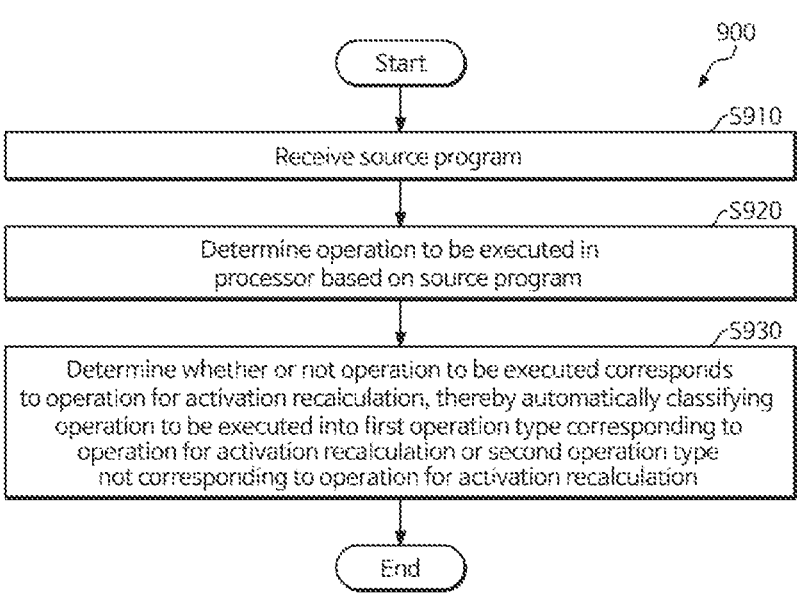
FIG. 9 is a flowchart illustrating a method for compilation optimization using activation recalculation.

FIG. 9 is a flowchart illustrating a method 900 for compilation optimization using activation recalculation. The method 900 for compilation optimization using activation recalculation may be performed by a processor (e.g., one or more processors of a user terminal or a computing device such as an information processing system). The method 900 for compilation optimization using activation recalculation may be initiated by the processor receiving a source program, at S910.

The processor may determine an operation to be executed in the processor based on the source program, at S920.

The processor may determine whether or not the operation to be executed corresponds to an operation for activation recalculation, thereby automatically classifying the operation to be executed into a first operation type corresponding to the operation for activation recalculation or a second operation type not corresponding to the operation for activation recalculation, at S930.

The processor may determine whether the operation to be executed corresponds to an operation for activation recalculation based on a memory usage of an activation associated with the operation to be executed and a processing time of the operation to be executed, thereby automatically classifying the operation to be executed into the first operation type or the second operation type.

For example, the processor may classify the operation to be executed into the first operation type, in response to determining that the memory usage of the activation associated with the operation to be executed against the processing time of the operation to be executed is equal to or greater than the first threshold, and classify the operation to be executed into the second operation type, in response to determining that the memory usage of the activation associated with the operation to be executed against the processing time of the operation to be executed is less than the first threshold. In this case, the first threshold may be updated based on throughput according to one or more iterations of the executable program based on the source program.

The operation to be executed includes a plurality of operations, and the processor may arrange the plurality of operations in descending order of memory usage of activation associated with each of the plurality of operations against the processing time of each of the plurality of operations, calculate, with respect to the arranged plurality of operations, a cumulative usage of activation memory, starting from an operation having a highest memory usage of activation associated with each of the plurality of operations against processing time of each of the plurality of operations, to the target operation, and classify the target operation into the first operation type, if the cumulative usage of activation memory is less than a second threshold.

The processor may classify the target operation into the second operation type, if the cumulative usage of activation memory is greater than the second threshold.

The processor may arrange the plurality of operations in descending order of memory usage of activation associated with each of the plurality of operations against the processing time of each of the plurality of operations, calculate, with respect to the arranged plurality of operations, a cumulative processing time, starting from the operation having a highest memory usage of activation associated with each of the plurality of operations against the processing time of each of the plurality of operations, to the target operation, and classify the target operation into the first operation type, if the cumulative processing time is less than a third threshold. The processor may classify the target operation into the second operation type, if the cumulative processing time is greater than the third threshold.

The flowchart illustrated in FIG. 9 and the above description are merely examples, and may be implemented differently in some other examples. For example, in some examples, the order of respective steps may be changed, some steps may be repeatedly performed, some steps may be omitted, or some steps may be added.

The method described above may be provided as a computer program stored in a computer-readable recording medium for execution on a computer. The medium may be a type of medium that continuously stores a program executable by a computer, or temporarily stores the program for execution or download. In addition, the medium may be a variety of recording means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, and a ROM, a RAM, a flash memory, and so on. In addition, other examples of the medium may include an app store that distributes applications, a site that supplies or distributes various software, and a recording medium or a storage medium managed by a server.

The methods, operations, or techniques of the disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies according to design requirements imposed on the particular application and the overall system. Those skilled in the art may implement the described functions in varying ways for each particular application, but such implementation should not be interpreted as causing a departure from the scope of the disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the disclosure, computer, or a combination thereof.

Accordingly, various example logic blocks, modules, and circuits described in connection with the disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EE-PROM), flash memory, compact disc (CD), magnetic or optical data storage devices, and the like. The commands may be executable by one or more processors, and may cause the processor(s) to perform certain aspects of the functions described in the disclosure.

Although the examples described above have been described as utilizing aspects of the currently disclosed subject matter in one or more standalone computer systems, aspects are not limited thereto, and may be implemented in conjunction with any computing environment, such as a network or distributed computing environment. Furthermore, the aspects of the subject matter in the disclosure may be implemented in multiple processing chips or devices, and storage may be similarly influenced across a plurality of devices. Such devices may include PCs, network servers, and portable devices.

Although the disclosure has been described in connection with some examples herein, various modifications and changes can be made without departing from the scope of the disclosure, which can be understood by those skilled in the art to which the disclosure pertains. In addition, such modifications and changes should be considered within the scope of the claims appended herein.

The invention claimed is:

1. A method performed by at least one computing device, the method comprising:

receiving a source program;

determining, based on the source program, an operation to be executed in a processor;

determining whether the operation to be executed in the processor corresponds to an operation for activation recalculation;

automatically classifying, based on the determination whether the operation to be executed in the processor corresponds to an operation for activation recalculation, the operation to be executed in the processor into a first operation type corresponding to the operation for activation recalculation or a second operation type not corresponding to the operation for activation recalculation;

outputting a result of the classifying the operation to be executed in the processor; and optimizing compilation of the source program by executing activation recalculation for at least some of first operation corresponding to the first operation type without allocating memory for storing activations associated with the first operation type.

2. The method according to claim 1, wherein the determining whether the operation to be executed in the processor corresponds to the operation for activation recalculation is based on:

a memory usage of an activation associated with the operation to be executed in the processor; and a processing time of the operation to be executed in the processor.

3. The method according to claim 2, wherein the automatically classifying comprises:

based on the memory usage of the activation divided by the processing time being greater than a first threshold, classifying the operation to be executed in the processor into the first operation type; or based on the memory usage of the activation divided by the processing time being less than the first threshold, classifying the operation to be executed in the processor into the second operation type.

4. The method according to claim 3, further comprising updating, based on a throughput of one or more iterations of an executable program, the first threshold, wherein the executable program is determined based on the source program.

5. The method according to claim 2, wherein the operation to be executed in the processor comprises a plurality of operations, and wherein the automatically classifying the operation to be executed in the processor into the first operation type or the second operation type comprises:

arranging the plurality of operations in a descending order of memory usage of activation associated with a respective operation of the plurality of operations divided by a processing time of the respective operation of the plurality of operations;

calculating, for the arranged plurality of operations, a cumulative usage of activation memory starting from an operation, having a highest value of memory usage divided by a processing time, to a target operation of the plurality of operations; and classifying, based on the cumulative usage of activation memory being less than a memory usage threshold, the target operation into the first operation type.

6. The method according to claim 2, wherein the operation to be executed in the processor comprises a plurality of operations, and wherein the automatically classifying the operation to be executed in the processor into the first operation type or the second operation type comprises:

arranging the plurality of operations in a descending order of memory usage of activation associated with a respective operation of the plurality of operations divided by a processing time of the respective operation of the plurality of operations;

calculating, for the arranged plurality of operations, a cumulative usage of activation memory starting from an operation, having a highest value of memory usage divided by a processing time, to a target operation of the plurality of operations; and classifying, based on the cumulative usage of activation memory being greater than a memory usage threshold, the target operation into the second operation type.

7. The method according to claim 2, wherein the operation to be executed in the processor comprises a plurality of operations, and wherein the automatically classifying the operation to be executed in the processor into the first operation type or the second operation type comprises:

arranging the plurality of operations in a descending order of memory usage of activation associated with a respective operation of the plurality of operations divided by a processing time of the respective operation of the plurality of operations;

calculating, for the arranged plurality of operations, a cumulative processing time starting from an operation, having a highest value of memory usage divided by a processing time, to a target operation of the plurality of operations; and classifying, based on the cumulative processing time being less than a time threshold, the target operation into the first operation type.

8. The method according to claim 2, wherein the operation to be executed in the processor comprises a plurality of operations, and wherein the automatically classifying the operation to be executed in the processor into the first operation type or the second operation type comprises:

arranging the plurality of operations in a descending order of memory usage of activation associated with a respective operation of the plurality of operations divided by a processing time of the respective operation of the plurality of operations;

calculating, for the arranged plurality of operations, a cumulative processing time starting from an operation, having a highest value of memory usage divided by a processing time, to a target operation of the plurality of operations; and classifying, based on the cumulative processing time being greater than a time threshold, the target operation into the second operation type.

9. The method according to claim 1, wherein the determining whether the operation to be executed in the processor corresponds to an operation for activation recalculation comprises:

determining that the operation to be executed in the processor corresponds to the operation for activation recalculation based on at least one of:

a memory usage of an activation associated with the operation; or a processing time of the operation to be executed in the processor.

10. The method according to claim 1, further comprising outputting, to the processor, the operation to be executed in the processor, wherein the outputting the result of the classifying the operation to be executed in the processor comprises outputting, to the processor, the result of the classifying the operation to be executed in the processor.

11. A non-transitory computer-readable medium storing instructions that, when executed by one or more processors, cause:

receiving a source program;

determining, based on the source program, an operation to be executed in a processor;

determining whether the operation to be executed in the processor corresponds to an operation for activation recalculation;

automatically classifying, based on the determination whether the operation to be executed in the processor corresponds to an operation for activation recalculation, the operation to be executed in the processor into a first operation type corresponding to the operation for activation recalculation or a second operation type not corresponding to the operation for activation recalculation;

outputting a result of the classifying the operation to be executed in the processor; and optimizing compilation of the source program by executing activation recalculation for at least some of first operation corresponding to the first operation type without allocating memory for storing activations associated with the first operation type.

12. An apparatus comprising:

a communication interface;

one or more processors; and memory storing instructions that, when executed by the one or more processors, cause the apparatus to:

receive a source program;

determine, based on the source program, an operation to be executed in a processor; and determine whether the operation to be executed in the processor corresponds to an operation for activation recalculation;

automatically classify, based on the determination whether the operation to be executed in the processor corresponds to an operation for activation recalculation, the operation to be executed in the processor into a first operation type corresponding to the operation for activation recalculation or a second operation type not corresponding to the operation for activation recalculation;

output a result of the classifying the operation to be executed in the processor; and optimize compilation of the source program by executing activation recalculation for at least some of first operation corresponding to the first operation type without allocating memory for storing activations associated with the first operation type.

13. The apparatus according to claim 12, wherein the instructions, when executed by the one or more processors, cause the apparatus to determine whether the operation to be executed in the processor corresponds to the operation for activation recalculation based on:

a memory usage of an activation associated with the operation to be executed in the processor; and a processing time of the operation to be executed in the processor.

14. The apparatus according to claim 13, wherein the instructions, when executed by the one or more processors, cause the apparatus to automatically classify the operation to be executed in the processor by:

based on the memory usage of the activation divided by the processing time being greater than a first threshold, classifying the operation to be executed in the processor into the first operation type; or based on the memory usage of the activation divided by the processing time being less than the first threshold, classifying the operation to be executed in the processor into the second operation type.

15. The apparatus according to claim 13, wherein the operation to be executed in the processor comprises a plurality of operations, and wherein the instructions, when executed by the one or more processors, cause the apparatus to automatically classify the operation to be executed in the processor by:

arranging the plurality of operations in a descending order of memory usage of activation associated with a respective operation of the plurality of operations divided by a processing time of the respective operation of the plurality of operations;

calculating, for the arranged plurality of operations, a cumulative usage of activation memory starting from an operation, having a highest value of memory usage divided by a processing time, to a target operation of the plurality of operations; and classifying, based on the cumulative usage of activation memory being less than a memory usage threshold, the target operation into the first operation type.

16. The apparatus according to claim 13, wherein the operation to be executed in the processor comprises a plurality of operations, and wherein the instructions, when executed by the one or more processors, cause the apparatus to automatically classify the operation to be executed in the processor by:

arranging the plurality of operations in a descending order of memory usage of activation associated with a respective operation of the plurality of operations divided by a processing time of the respective operation of the plurality of operations;

calculating, for the arranged plurality of operations, a cumulative usage of activation memory starting from an operation, having a highest value of memory usage divided by a processing time, to a target operation of the plurality of operations; and classifying, based on the cumulative usage of activation memory being greater than a memory usage threshold, the target operation into the second operation type.

17. The apparatus according to claim 13, wherein the operation to be executed in the processor comprises a plurality of operations, and wherein the instructions, when executed by the one or more processors, cause the apparatus to automatically classify the operation to be executed in the processor by:

arranging the plurality of operations in a descending order of memory usage of activation associated with a respective operation of the plurality of operations divided by a processing time of the respective operation of the plurality of operations;

calculating, for the arranged plurality of operations, a cumulative processing time starting from an operation, having a highest value of memory usage divided by a processing time, to a target operation of the plurality of operations; and classifying, based on the cumulative processing time being less than a time threshold, the target operation into the first operation type.

18. The apparatus according to claim 13, wherein the operation to be executed in the processor comprises a plurality of operations, and wherein the instructions, when executed by the one or more processors, cause the apparatus to automatically classify the operation to be executed in the processor by:

arranging the plurality of operations in a descending order of memory usage of activation associated with a respective operation of the plurality of operations divided by a processing time of the respective operation of the plurality of operations;

calculating, for the arranged plurality of operations, a cumulative processing time starting from an operation, having a highest value of memory usage divided by a processing time, to a target operation of the plurality of operations; and classifying, based on the cumulative processing time being greater than a time threshold, the target operation into the second operation type.

19. The apparatus according to claim 12, wherein the instructions, when executed by the one or more processors, cause the apparatus to determine whether the operation to be executed in the processor corresponds to an operation for activation recalculation by:

determining that the operation to be executed in the processor corresponds to the operation for activation recalculation based on at least one of:

a memory usage of an activation associated with the operation; or a processing time of the operation to be executed in the processor.

20. The apparatus according to claim 12, wherein the instructions, when executed by the one or more processors, cause the apparatus to:

allocate memory for storing activations associated with the second operation type;

skip activation recalculation for at least some of second operation corresponding to the second operation type; and store, in the allocated memory, the activations associated with the second operation type.

\*   \*   \*   \*   \*